United States Patent [19]

Akasaka et al.

[11] Patent Number: 4,608,203
[45] Date of Patent: Aug. 26, 1986

[54] PROCESS FOR PRODUCING SOYBEAN PROTEIN POWDER USING A FLUIDIZED BED

[75] Inventors: Takeshi Akasaka, Izumisano; Masahiko Terashima, Osaka; Hiroyuki Kawade, Izumi; Hitoshi Taniguchi, Sennan, all of Japan

[73] Assignee: Fuji Oil Company, Ltd., Osaka, Japan

[21] Appl. No.: 680,295

[22] Filed: Dec. 10, 1984

[30] Foreign Application Priority Data

Dec. 10, 1983 [JP] Japan ................................ 58-233199

[51] Int. Cl.⁴ ............................................... A23J 1/14
[52] U.S. Cl. .................................... 530/378; 426/590; 426/598; 426/656
[58] Field of Search ...................... 260/123.5; 426/656

[56] References Cited

U.S. PATENT DOCUMENTS

| | | | |
|---|---|---|---|
| 3,451,828 | 6/1969 | Baer et al. | 260/123.5 X |
| 4,131,607 | 12/1978 | Petit et al. | 260/123.5 |
| 4,197,327 | 4/1980 | Kawasaki et al. | 260/123.5 X |
| 4,221,707 | 9/1980 | Reu | 260/123.5 |
| 4,364,862 | 12/1982 | Teranishi et al. | 260/123.5 X |
| 4,379,084 | 4/1983 | Teranishi et al. | 260/123.5 X |

Primary Examiner—Howard E. Schain
Attorney, Agent, or Firm—Wenderoth, Lind & Ponack

[57] ABSTRACT

A process for producing a soybean protein powder having improved reduced dustability and excellent water dispersibility which comprises spraying an aqueous liquid preferably containing a surfactant on to a starting soybean protein powder material to moisten and agglomerate particles of the powder material in a fluidized bed and drying the powder material simultaneously or subsequently.

13 Claims, 2 Drawing Figures

PROCESS FOR PRODUCING SOYBEAN PROTEIN POWDER USING A FLUIDIZED BED

FIELD OF THE INVENTION

The present invention relates to a process for producing a soybean protein powder which has improved reduced dustability and can be readily and quickly dispersed and dissolved in water.

BACKGROUND OF THE INVENTION

Soybean protein powders have been used in a wide variety of foods such as processed meat products, fish paste products, frozen cooked foods, beverages, desserts and the like for various purposes, for example, to improve physical properties (e.g., gel formation ability) of foods, to enhance nutrition of foods, to reduce manufacturing cost of foods and the like. However, a soybean protein powder has dustability and, when it is taken out from a package, it shows so-called "dusting". Further, when a soybean protein powder is simply admixed with water by stirring, it forms undissolved lumps, which makes it difficult to prepare a solution or a paste of soybean protein powder within a short period of time.

Hitherto some methods have been proposed for improving properties of a soybean protein powder such as water dispersibility and the like. For example, Japanese Patent Publication Nos. 6817/1971 and 52542/1981 disclose that a soybean protein powder having improved properties can be produced by heating an aqueous solution of soybean protein for a certain period of time with a jet cooker and then spray-drying. Further, Japanese Laid Open Publication No. 35449/1976 discloses that a soybean protein powder having improved properties can be obtained by adding a surfactant such as lecithin to a solution containing soybean protein, homogenizing the resulting mixture and then spray-drying. However, these conventional methods provide less satisfactory improvements.

Further, in the production of a milk powder, such a technique that a starting powder material is agglomerated by using a so-called instantizer to increase its particle size by 30 to 150 times as large as its original size has been commonly employed to continuously produce the milk powder in a large scale. However, this technique is hardly applicable to the production of a soybean protein powder. That is, in the case of a milk powder, particles tend to be immediately agglomerated with steam to readily form larger particles. In addition, coating can be readily performed, because the starting powder material scarcely contains fine particles which can pass through a 200 mesh screen (number of openings/inch) and, probably, lactose contained in the powder material functions in this agglomeration. In contrast to this, a soybean protein powder contains a substantial amount of fine particles which can pass through a 200 mesh screen and soybean protein is more liable to undergo heat denaturation than milk protein. Therefore, it is very difficult to agglomerate soybean protein by using an instantizer while preventing the deterioration of the physical properties such as gel formation ability. Furthermore, even in the production of a milk power, it is said that agglomeration of particles with a fluidized bed in a continuous process is very difficult [Syokuhin Kogyo, Vol. 24, No. 16, p 46 (1981)].

In order to reduce dustability and to improve water dispersibility of a soybean protein powder, the present inventors have intensively studied agglomeration of soybean protein powder particles and the use of surfactants. As the result, it has been found that, apart from the production of an agglomerated product having a particle size of more than two or three hundreds microns like a conventional agglomerated product, some advantages can be obtained by using a fluidized bed. That is, it has been found that, when a soybean protein powder is treated in a fluidized bed, it is possible to reduce its dustability and to improve its water dispersibility and other properties, even if the particle size thereof is about one hundred and several tens microns or less. It has been further found that it is possible to perform the treatment in a fluidized bed and subsequent steps continuously without deterioration of the physical properties such as gel forming ability by moistening and drying soybean protein powder particles in a fluidized bed simultaneously or subsequently. In addition, it has been found that it is possible to perform effective coating of a surfactant, which results in further reduction of dustability and further improvement of water dispersibility and that the desired effect can be obtained by using a considerably small amount of a surfactant and therefore taste of the surfactant does not adversely affect the resulting product.

OBJECTS AND SUMMARY OF THE INVENTION

The main object of the present invention is to provide a process for producing a soybean protein powder having improved reduced dustability and improved physical properties such as excellent water dispersibility, gel forming ability and the like. This object as well as other objects and advantages of the present invention will become apparent to those skilled in the art from the following description and the accompanying drawings.

According to the present invention, there is provided a process for producing a soybean protein powder which comprises spraying an aqueous liquid onto a starting soybean protein powder material to moisten and agglomerate the powder material in a fluidized bed and drying the powder material simultaneously or subsequently. Preferably, in the process of the present invention, the spray droplets of the aqueous liquid contain a surfactant alone or in combination with a fat or oil. Further, preferably, in the process of the present invention, moistening and drying are performed in one fluidized bed simultaneously.

DETAILED DESCRIPTION OF THE INVENTION

Figure 1:
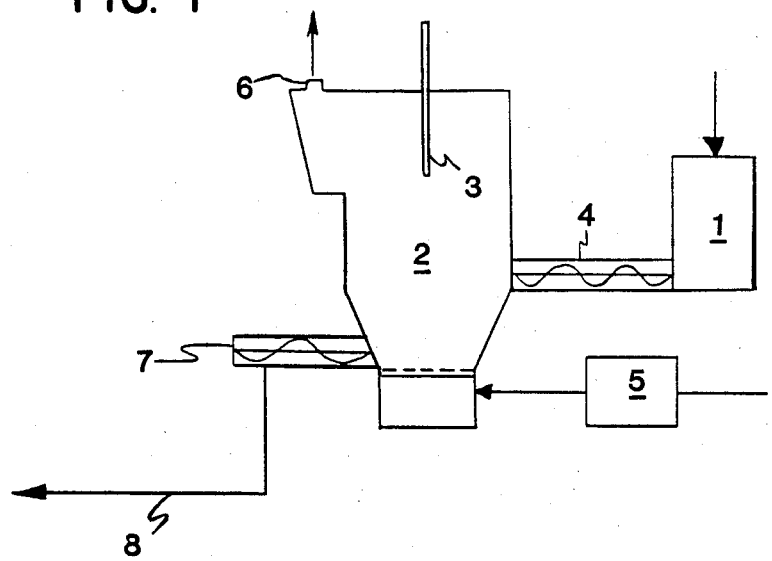
FIG. 1 is a schematic flow chart illustrating a preferred embodiment of the process of the present invention.

The starting soybean protein powder material used in the process of the present invention is not limited to a specific one and can be obtained by powdering a soybean protein solution or dispersion according to a known method such as spray drying and the like. In general, a soybean protein powder contains fine particles which pass through a 200 mesh screen and, even if a greater part of particles of a soybean protein powder is such fine particles, the powder can be used as the starting soybean protein powder material in the process of the present invention. A particular preparation process of the starting soybean protein powder material can be appropriately chosen according to a particular use of the desired product. Further, as a soybean protein solution or dispersion for the preparation of the starting soybean protein powder material, there can be used, for example, an aqueous extract obtained by extracting soybeans or defatted soybeans with an aqueous medium; a solution or dispersion obtained by separating protein from such an aqueous extract by acid precipitation and then neutralizing the precipitated protein or by ultrafiltration, reverse osmosis or the like; or a material obtained by subjecting the above aqueous extract, solution or dispersion to heat treatment and/or hydrolysis treatment and the like. The soybean protein solution or dispersion can be also appropriately chosen according to the particular use of the desired product. For example, in case of using the product obtained for beverages, the soybean protein solution or dispersion can be heated at pH 5.8 to 6.6 at a temperature of 120° C. or higher for several seconds or longer before powdering to lower the Nitrogen Solubility Index (hereinafter referred to as NSI) to about 75 or lower or can be treated with a protease so that the viscosity of an aqueous dispersion of the product is lowered to make it easy to drink. In addition, salt, sugars and the like can be added to the soybean protein solution or dispersion. In case of using the product obtained for fish pastes and the like where gel forming ability is required, the soybean protein solution or dispersion can be heated at a neutral pH range at a high temperature for a short period of time with preventing lowering of NSI. Further, in case of further improving color of the product obtained, the starting soybean protein powder material is prepared by removing soluble sugars in soybeans as much as possible and then sterilizing the soybean protein solution or dispersion by heating.

The term "fluidized bed" used herein means a dynamic suspension state of a powder in a stream of gas, i.e., a transition state of a powder placed in a stream of a gas in a certain space, which appears in the course of shifting the state of the powder from a fixed bed state to a transportation state according to a flow rate of the gas. That is, in the process of the present invention, the starting soybean protein powder material is suspended in a stream of gas such as air, etc. to obtain a dynamic suspension state of the powder material and an aqueous liquid is sprayed onto the powder material to moisten it. Thereby water is supplied to the surface of the powder material and the particles of the powder material collide with each other to effect agglomeration. Then the resulting agglomerated particles having a larger particle size are fixed by simultaneous or subsequent drying.

In the process of the present invention, the aqueous liquid sprayed onto the particles of the starting soybean protein powder material in the fluidized bed may be water or, preferably, an aqueous solution or dispersion containing an appropriate amount of a surfactant and, optionally, one or more other ingredients such as a fat or oil, a solvent, a binder (e.g., CMC, starch, dextrose, gelatin, etc.) and the like.

The operation for spraying the aqueous liquid droplets in a fluidized bed can be performed by using a fluidized bed dryer equipped with a spray nozzle. Both a single fluidized bed type and a multiple fluidized bed type can be used and the operation can be performed in a batch process or in a continuous process. The amount of droplets to be sprayed is 5% by weight or more, usually, up to 25% by weight, preferably, 10 to 20% by weight based on the weight of the starting soybean protein powder material. When the amount of droplets is too small, agglomeration of the powder material becomes insufficient. On the other hand, if the amount is too large, too much energy is required in drying and it is undesirable from the economical viewpoint. Usually, drying can be performed by heating and, in view of preservation of the product, obtained, it is preferable to performed drying until the moisture content of the product becomes 10% by weight or less, preferably, 8% by weight or less.

In a preferred aspect of the process of the present invention, moistening and drying of the starting soybean protein powder material are performed in one fluidized bed simultaneously. By performing moistening and drying in this way, deterioration of physical properties of the resulting soybean protein powder such as gel forming ability and the like can be prevented because remarkable rise in a processing temperature of soybean protein can be avoided. Further, a subsequent drying step which is necessary for a conventional fluidized bed treatment is not required, which is of great advantage in view of an apparatus used. In addition, a batch-wise fluidized bed treatment can be avoided and a fluidized bed treatment and subsequent treatments can be performed in a continuous process, which is also of great advantage in view of a large scale production. In order to perform moistening and drying simultaneously in one fluidized bed, it is necessary to elevate the temperature of the air stream or air flow to be supplied to the fluidized bed and, usually, a temperature of 80° C. or more, preferably, 110° to 170° C. is employed. In this case, it is preferable to spray droplets countercurrently to the direction of the air flow or stream. Any known device or apparatus can be used for automatically, continuously and quantitatively feeding the starting soybean protein powder material to the fluidized bed and for automatically discharging agglomerated particles from the fluidized bed.

FIG. 1 shows a schematic flow chart of one preferred embodiment for performing moistening and drying simultaneously in one fluidized bed. In FIG. 1, the starting soybean protein powder material is fed from a spray dryer (not shown) to a hopper 1 and then fed to a vertical fluidized bed dryer 2 equipped with a spray nozzle 3 through a screw conveyor system 4 having a rotary valve (not shown). Then, the starting soybean protein powder material is suspended in the dryer 2 by hot air flow suppried at the bottom of the dryer from a heat exchanger 5 and exhausted through the outlet 6 having an air filter (not shown) at the top of the dryer to form a fluidized bed, while droplets of an aqueous liquid is sprayed from the nozzle 3 on to the powder material. Thus, the starting soybean protein powder material is moistened to agglomerate particles and dried simultaneously in the dryer 2 and the resulting sufficiently agglomerated particles are spontaneously moved down toward the bottom of the fluidized bed. Then, the agglomerated particles are discharged from the bottom of the dryer 2 by means of another screw conveyor system 7 having a rotary valve (not shown). The agglomerated particles are transported through a pipe 8 to a hopper (not shown) by means of air flow to obtain the desired soybean protein powder having improved reduced dustability and improved physical properties such as excellent water dispersibility and excellent gel forming ability.

Figure 2:
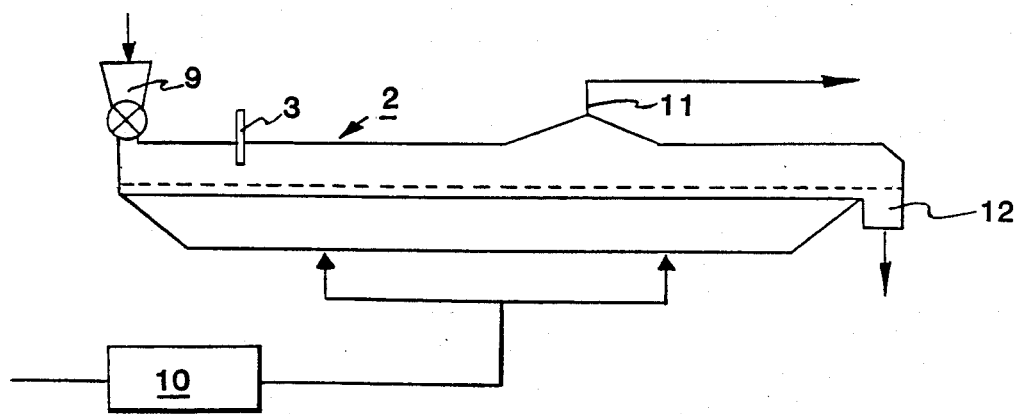
FIG. 2 is a schematic flow chart illustrating another preferred embodiment of the process of the present invention.

FIG. 2 also shows a schematic flow chart of another preferred embodiment for performing moistening and drying in one fluidized bed. In FIG. 2, the starting soybean protein powder material prepared in a spray dryer (not shown) is fed to a fluidized bed dryer 2 having a spray nozzle 3 through a hopper 9 having a rotary valve. Then, the starting soybean protein powder material is suspended in the dryer 2 by hot air flow suppried at the bottom of the dryer from a heater 10 to form a fluidized bed, while droplets of an aqueous liquid is sprayed from the nozzle 3 on to the powder material. Thus, the starting soybean protein powder material is moistened in the dryer 2 to agglomerate particles and the resulting sufficiently agglomerated particles are spontaneously moved toward the right side of the fluidized bed due to vibration of the dryer and the newly fed starting soybean protein powder material and dried by hot air. Hot air is exhausted from the opening 11 at the top of the dryer together with fine particles which are insufficiently agglomerated and the fine particles are recovered by a cyclone (not shown). The sufficiently agglomerated particles are discharged from the outlet 12 at the right side end of the dryer 2 to obtain the desired soybean protein powder having improved reduced dustability and improved physical properties such as excellent water dispersibility and excellent gel forming ability.

Alternatively, in the process of the present invention, moistening and drying can be performed separately. For example, the desired soybean protein powder can be prepared in a continuous process by moistening the starting soybean protein powder material in a fluidized bed to agglomerate particles and then drying the particles in a separate drying apparatus, or in a batch process by moistening the starting soybean protein powder material in a fluidized bed to agglomerate particles and then drying the particles in the same fluidized bed under different conditions such as at a different temperature. However, in these cases, it is preferable to suppress agglomeration of particles in the fluidized bed to some extent to avoid deterioration of physical properties of the resulting soybean protein powder such as gel forming ability and the like. The degree of suppression of agglomeration varies depending upon the particle size of the starting soybean protein powder material. For example, when a greater part of the particles of the starting soybean protein powder material is fine particles which pass through a 200 mesh screen, it is preferable to adjust conditions for agglomeration so that the amount of coarse particles which do not pass through a 80 mesh screen is 40% or less in the agglomerated particles at the outlet of the fluidized bed. Of course, in case of using the resulting soybean protein powder for a beverage or the like where gel forming ability is not required, suppression of agglomeration is not needed.

In another preferred aspect of the process of the present invention, the fluidized bed treatment is performed under such conditions that a surfactant is distributed on the surfaces of particles of the starting soybean protein powder material. Particularly, it is preferable that droplets of an aqueous liquid sprayed in the fluidized bed contain a surfactant alone or in combination with a fat or oil. That is, it has hitherto been proposed that water dispersibility of a soybean protein powder can be improved by adding a surfactant to a soybean protein solution or dispersion before powdering. Of course, in the present invention, such a soybean protein powder can be used as the starting soybean protein powder material. However, when a surfactant is added to the starting soybean protein powder material after powdering, not before powdering, by incorporating it into droplets sprayed in the fluidized bed, a more remarkable effect of the addition of the surfactant can be obtained. Futher the amount of the surfactant used can be reduced and thereby the flavor of a surfactant does not adversely affect the flavor of the product obtained. In order to distribute a surfactant onto particles of the starting soybean protein powder material, for example, a surfactant containing liquid can be sprayed onto soybean protein particles sprayed from a nozzle during spray drying of a soybean protein solution. Further, it is possible to mix a surfactant with a soybean protein powder after powdering. However, in the present invention, it is preferable to distribute a surfactant by dissolving or dispersing it in the aqueous liquid to be sprayed into the fluidized bed because the surfactant can be distributed uniformly and the amount thereof can be reduced. In addition, some additional advantages can be obtained by incorporating a surfactant into droplets sprayed into the fluidized bed. For example, when the starting powder material contains a surfactant before it is introduced into the fluidized bed, depending upon the amount of the surfactant, the powder is liable to form so-called bridge in a cyclone which is usually employed in a spray drying porcess of soybean protein or to disturb the formation of a good fluidized bed. This can be avoided by incorporation of a surfactant in droplets sprayed into the fluidized bed. Further, when a surfactant is mixed with a soybean protein powder after the fluidized bed treatment, the particles are insufficiently coated with the surfactant and the powder tends to adhere to the walls of the transporting pipes and other equipments. This can be also avoided.

Examples of the surfactant used in the present invention include lecithin, glycerin fatty acid esters, sorbitan fatty acid esters, propylene glycol fatty acid esters, sugar fatty acid esters and the like. These surfactants can be used alone or in combination thereof. Further, these surfactants can be used together with fats and oils such as soybean oil, rapeseed oil, coconut oil, palm oil, beef tallow, lard, and hydrogenated or fractionated oils or fats thereof and/or solvents such as alcohols (e.g., ethanol, glycerol, propylene glycol). The surfactant is used in an amount of 0.01 to 10% by weight, usually 1% by weight or less based on the weight of the starting soybean protein powder material. When gel forming ability is particularly important for the desired product, the starting soybean protein powder material having a high NSI, for example, that of 80 or more is used and, in this case, the surfactant exerts its effect even in an amount of 0.1% by weight or lower based on the weight of the starting soybean protein powder material. Further, when the starting soybean protein powder material has a high NSI such as above, it is preferable to use the surfactant together with the fat or oil because, when the surfactant is used alone, the wettability by water of the resulting soybean protein powder becomes too high and rather tends to form undissolved lumps. In this case, the weight ratio of the surfactant to the fat or oil is 9:1 to 1:9, preferably, 7:3 to 1:9.

The particle size of the agglomerated soybean protein powder obtained by the process of the present invention varies depending upon various factors such as the particle size of the starting soybean protein powder material, whether moistening and drying is performed in the fluidized bed simultaneously or not, whether classification and/or disintegration is performed after moistening and drying or not, and the like. However, in the present invention, even if the macroscopic appearance of the resulting soybean protein powder is such that a greater part of the particles are finely divided particles having a particle size of one hundred and several tens microns or less, agglomeration of the particles thereof is observed by using, for example, a scanning electron microscope and dustability and water dispersibility thereof are remarkably improved. In addition, these properties can be further improved by using the surfactant.

The following examples further illustrate the present invention in detail but are not to be construed to limit the scope thereof.

EXAMPLE 1

A commercially available isolated soybean protein powder (Fujipro-R manufactured by Fuji Oil Co., Ltd.; 15 kg, NSI: 95, content of fine particles passing through a 200 mesh screen: 60%, moisture content: 6%) was fed to a fluidized bed dryer (air flow temperature: 80° C.) to form a fluidized bed. An emulsion of lecithin, an oil (soybean oil) and water (1:1:120) was sprayed onto the starting powder material at the rate of 240 ml/minute from the top of the fluidized bed dryer and the fluidized bed treatment was continued for 7.5 minutes to moisten and agglomerate the particles. After the treatement, the spray was ceased but air flow was maintained at the same temperature for additional 10 minutes to dry the particles to obtain the desired soybean protein powder which had such a particle size at the outlet of the fluidized bed such that 19% of the particles passed through a 200 mesh screen, 27% thereof remained on a 80 mesh screen and 94% thereof passed through a 42 mesh screen. The resulting powder had, an NSI of 94.5 and a moisture content of 6%. In comparison with the starting powder material, the soybean protein powder thus obtained showed remarkably improved dustability and water dispersibility and had the same gel forming ability and flavor as those of the starting powder material even after storing at 20° C. for 3 months. Dispersibilties, wettabilities by water and gel forming abilities of the starting powder material and the resulting soybean protein powder were determined as follows:

Dispersibility (A): A sample (200 g) and water (800 g, at 0° C.) was mixed in a mixer ("Kenmix" manufactured by Kenwood Co.,) at 60 to 70 r.p.m. for 5 minutes. Then, the number of undissolved lumps formed in the resulting paste (2 g) was counted.

Wettability by water: The time (seconds) required to make the sample as a whole become wet after initiation of mixing in the above determination of dispersibility was measured.

Gel forming ability: An aqueous saline solution was added to a sample to prepare a 12% solution of the sample. The solution was deaerated, heated and cooled to form a gel and the measurement of a curd meter was performed.

The results are shown in Table 1.

TABLE

| Sample | Starting soybean protein powder material | Soybean protein powder obtained |
| --- | --- | --- |
| Dispersibility (A) | 10.0 | 1.0 |
| Wettability by water | 25 | <10 |
| Gel forming ability | 25 | 25 |

EXAMPLE 2

A soybean protein powder was obtained by the same manner as in Example 1 except that the fluidized bed treatment was performed for 15 minutes by using an emulsion of lecithin, an oil (soybean oil) and water (0.5:0.5:120) and drying until moisture content of the treated powder material was 6%. 45% Of the particles of the soybean protein powder thus obtained remained on a 80 mesh screen. Although gel forming ability thereof was a little bit lowered, dustability and dispersibility were remarkably improved in comparison with the starting soybean protein powder material. The good flavor of the starting powder material was maintained. The soybean protein powder obtained showed 0.5 of dispersibility (A), <10 of wettability by water and 15 of gel forming ability in the same test as in Example 1.

EXAMPLE 3

Defatted soybeans of low denaturation degree were extracted with water and insoluble matter was removed. An acid was added to the extract to precipitate and isolate the protein. It was neutralized, sterilized with heating and spray-dried to obtain a starting soybean protein powder material (pH: 7.0, NSI: 96, content of fine particles passing through a 200 mesh screen: 65%). The starting powder material was fed to a hopper and continuously treated in the fluidized bed as shown in FIG. 1 (air flow temperature: 130° C.). In the fluidized bed, there was sprayed the same emulsion as that of Example 1 in the ratio of 12% by weight based on the weight of the starting powder material and the average retention time of the powder material in the fluidized bed dryer was 7 minutes. The resulting agglomerated powder was continuously discharged from the fluidized bed and transported to a tank without drying. The powder was passed through a 20 mesh screen to remove coarse particles and packed in a bag. The soybean protein powder obtained had such a particle size at the outlet of the fluidized bed that 21% of the particles passed through a 200 mesh screen, 17% thereof remained on a 80 mesh screen and 98% thereof passed through a 42 mesh screen. The soybean protein powder had a moisture content of 6% and NSI of 96. It had no dustability and excellent water dispersibility and excellent gel forming ability. The flavor of the starting powder material was maintained. The soybean protein powder showed 2.5 of dispersibility (A), <10 of wettability by water and 25 of gel forming ability in the test as in Example 1.

As a reference, a soybean protein powder was prepared by adding lecithin to the above neutralized soybean protein solution in an amount of 0.1% by weight or 1% by weight based on the solid content thereof, homogenizing the mixture, sterilizing with heating and spray-drying. The resulting powder showed 6 of dispersibility (A) and 15 of wettability by water, in case of addition of 0.1% of lecithin and 6 of dispersibility (A)

and 10 or wettability by water, in case of addition of 1% of lecithin in the same test as in Example 1.

EXAMPLE 4

According to the same manner as in Example 1, a soybean protein powder was obtained by using the spray dried starting soybean protein powder material obtained in Example 3 and spraying water for 10 minutes or 1.5% aqueous solution of Span 20 (sorbitan fatty acid ester manufactured by Kao Atlas in Japan) for 7 minutes. The soybean protein powder thus obtained had improved wettability by water and dispersibility. Dispersibility (A), wettability by water and gel forming ability of the powder tested by the same manner as in Example 1 are shown in Table 2.

TABLE 2

| Spray solution | Water | Span 20 sol. |
| --- | --- | --- |
| Dispersibility (A) | 7 | 2.5 |
| Wettability by water | 22 | 10 |
| Gel forming ability | 25 | 25 |

EXAMPLE 5

A soybean protein powder was obtained according to the same manner as in Example 1 except that isolated soybean protein powder having such a particle size that 26% of particles passed through a 200 mesh screen was used as the starting soybean protein powder material. The resulting soybean protein powder has such a particle size at the outlet of the fluidized bed that 8% of the particles passed through a 200 mesh screen and 41% of the particles remained on a 80 mesh screen. It showed 1.0 of dispersibility (A), <10 of wettability by water and 24 of gel forming ability in the same test as in Example 1.

EXAMPLE 6

A soybean protein powder was obtained according to the same manner as in Example 3 except that the starting soybean protein powder material was an isolated soybean protein powder (NSI: 73, content of particles passing through a 200 mesh screen: 60%, moisture content: 6%) prepared by heating an acid precipitated soybean protein at pH 6.5 at 130° C. for 20 seconds, cooling and spray-drying and that the emulsion of lecithin, an oil (palm oil) and water (3:1:120) was sprayed in the fluidized bed. The resulting soybean protein powder had moisture content of 6% and NSI or 72 and the particle size thereof was the same as that of the product in Example 3. It had no dustability and excellent dipersibility. Further, it was pleasant to drink and suitable for production of beverages. Dispersibility (B) of the starting powder material and the resulting powder product were determined as follows:

The time (seconds) required for homogeneously dispersing sample (1 g) in water (200 ml) at 20° C. was measured by using a device composed of a 300 ml beaker containing water (200 ml) and a spatula which was vertically suspended so that the spoon shaped end thereof was dipped in water and rotated at 200 r.p.m.

As the result, the starting soybean protein powder material showed 280 of dispersibility (B) and the resulting soybean protein powder showed <20 of dispersibility (B).

What is claimed is:

1. A process for producing a soybean protein powder which comprises spraying droplets of an aqueous liquid onto a starting soybean protein powder material in an amount of 5 to 25% by weight based on the weight of the powder material to moisten and agglomerate particles of the powder material in a fluidized bed and drying the powder material simultaneously or subsequently.

2. A process according to claim 1, wherein droplets of the aqueous liquid contain a surfactant.

3. A process according to claim 1, wherein droplets of the aqueous liquid contain a surfactant and a fat or oil.

4. A process according to claim 2, wherein the surfactant is a member selected from the group consisting of lecithin, glycerin fatty acid esters, sorbitan fatty acid esters, propylene glycol fatty acid esters and sugar fatty acid esters.

5. A process according to claim 2, wherein the amount of the surfactant is 0.01 to 10% by weight based on the weight of the starting soybean protein powder material 6. A process according to claim 3, wherein the ratio of the surfactant to the fat or oil in the droplets is 9:1 to 1:9.

7. A process according to claim 3, wherein moisture content of the powder after drying is 10% or less.

8. A process according to claim 1, wherein moistening and drying is performed in the same fluidized bed.

9. A process according to claim 8, air flow temperature in the fluidized bed is 80° C. or higher.

10. A process according to claim 8, wherein the starting soybean protein powder material is continuously fed to the fluidized bed and the resulting agglomerated soybean protein powder is continuously discharged from the fluidized bed.

11. A process according to claim 10, wherein air flow temperature in the fluidized bed is 110° to 170° C.

12. A process according to claim 3, wherein the amount of the surfactant is 0.01 to 10% by weight based on the weight of the starting soybean protein powder material.

13. A process according to claim 3, wherein the surfactant is a member selected from the group consisting of lecithin, glycerin fatty acid esters, sorbitan fatty acid esters, propylene glycol fatty acid esters and sugar fatty acid esters.

* * * * *